UNITED STATES PATENT OFFICE.

FRIEDRICH ERNST, OF SAN FRANCISCO, CALIFORNIA.

PROCESS OF WORKING COPPEROUS SILVER ORES.

SPECIFICATION forming part of Letters Patent No. 342,903, dated June 1, 1886.

Application filed July 18, 1885. Serial No. 172,021. (No specimens.)

*To all whom it may concern:*

Be it known that I, FRIEDRICH ERNST, of the city and county of San Francisco, State of California, have invented an Improvement in Processes of Working Copperous Silver Ores; and I hereby declare the following to be a full, clear, and exact description of the same.

My invention relates to a new and useful process of working silver ores containing copper for the purpose of extracting the silver therefrom.

My invention consists in stamping or crushing the ore in the presence of a hot aqueous solution of salt—such as sea-water heated—and in subsequently treating the pulp thus formed by amalgamation, as I shall hereinafter fully describe. The copperous silver ore is placed in a battery with a quantity of hot salt-water containing about three per cent. of salt—such as common sea-water. The hot salt-water is used in the usual manner, and instead of the fresh water commonly admitted to the battery. It may be prepared in any available way, though perhaps the least expensive would be to run the exhaust-steam from the engine through a suitable condenser to heat the salt-water which should preferably reach the boiling-point before being admitted to the battery. From the battery the pulp passes into the tanks to settle. It is then taken to the pans and amalgamated with quicksilver in the ordinary manner.

The essence of the process lies in the treatment of the ore with hot salt-water while still in the battery. The chemical action is as follows: The chlorine of the salt-water forms, with a portion of the copper of the ore, chloride of copper, and with the silver it forms chloride of silver. The surplus copper acting on the chloride of silver precipitates the silver as native silver and unites with the chlorine thus freed as chloride of copper. Thus the copper is entirely taken up by the chlorine, while the silver is left free. This is all done in the battery. Now, when the pulp treated reaches the amalgamating-pans, the native silver already separated is easily amalgamated, and with little loss of quicksilver, while the copper which was in the ore, and which would also have been amalgamated and have produced a low-grade bullion, is prevented from amalgamating by its union with the chlorine. The result of this process is a bullion of nine hundred and fifty to nine hundred and eighty fine.

I am aware of the use of salt-water in other metallurgical processes, and even in amalgamating-pans; but I do not wish to have my process confounded therewith, especially with the latter, for the presence of quicksilver in the pans essentially alters whatever reactions would be due to the salt-water alone; but by completing these reactions in the battery, and before the amalgamation, I free the silver entirely, so that it may be readily taken up by the quicksilver.

I am also aware that both hot and cold water have been introduced into the battery, and that carbonate of soda and some other reagents have been used, which effect a precipitation of the precious metals; but these have no application to my process, which is simply for the treatment of copperous silver ores by the introduction of hot salt-water while the ore is being ground.

Having thus described my invention, what I claim as new, and desire to secure by Letters Patent, is—

The process of working copperous silver ores, which consists in stamping or crushing the ore in the presence of or with a hot aqueous solution of salt, and then in treating the pulp by amalgamation, substantially as herein described.

In witness whereof I have hereunto set my hand.

FRIEDRICH ERNST.

Witnesses:
JOHN PERSHBAKE,
J. H. BLOOD.